Patented June 24, 1930

1,766,441

UNITED STATES PATENT OFFICE

RUDOLF LIESKE, OF LEVERKUSEN, NEAR COLOGNE, AND WILHELM SCHEPSS, OF WIESDORF, NEAR COLOGNE, GERMANY, ASSIGNORS, BY MESNE ASSIGNMENTS, TO WINTHROP CHEMICAL COMPANY, OF NEW YORK, N. Y., A CORPORATION OF NEW YORK

DISINFECTING, BACTERICIDAL, INSECTICIDAL, FUNGICIDAL, AND VERMIN-DESTROYING PREPARATION

No Drawing. Application filed February 14, 1925, Serial No. 9,338, and in Germany April 10, 1924.

It is well known that basic dyestuffs such as triphenylmethane dyes (malachite green), oxazines (Meldola blue, Nile blue), thiazines (methylene blue), acridines (acridine yellow, benzoflavine), azine (safranine), azo dyes (e. g. Bismark brown), etc., act upon fungi and bacteria but not upon vermin, the dyestuffs being ordinarily used for this purpose in the form of oxalate of the respective dye base.

The subject of the present invention consists in using the salts of such basic dyes with arsenious and arsenic acid, which have proved to be highly efficacious disinfecting, bactericidal, insecticidal and fungicidal products, while also being effective for use in exterminating vermin (rats, mice, sparrows etc.) and in spraying plants (vines etc.). An aqueous solution of the arsenate of malachite green for instance, even at a high dilution destroys mildew, oidium and other fungi etc. and is at the same time a powerful poison for animal pests. It has likewise been found advantageous in preserving wood by impregnation.

We claim:—

1. The herein described new disinfecting, bactericidal, insecticidal, fungicidal and vermin destroying preparations comprising a compound of malachite green and an acid of arsenic.

2. The herein described new disinfecting, bactericidal, insecticidal, fungicidal and vermin destroying preparations comprising the arsenate of malachite green.

3. The process for disinfecting plants and killing vermin, which comprises the use of a compound of malachite green with an acid of arsenic.

4. The process for disinfecting plants and killing vermin, which comprises the use of the arsenate of malachite green.

In testimony whereof we have hereunto set our hands.

RUDOLF LIESKE.
WILHELM SCHEPSS.